US010778002B2

(12) United States Patent
Chen

(10) Patent No.: US 10,778,002 B2
(45) Date of Patent: Sep. 15, 2020

(54) SERVICE PANEL CIRCUIT FOR AUTOMATIC AC AND DC POWER DISTRIBUTION

(71) Applicant: Kong-Chen Chen, Gilroy, CA (US)

(72) Inventor: Kong-Chen Chen, Gilroy, CA (US)

(*) Notice: Subject to any disclaimer, the term of this patent is extended or adjusted under 35 U.S.C. 154(b) by 330 days.

(21) Appl. No.: 15/820,894

(22) Filed: Nov. 22, 2017

(65) Prior Publication Data

US 2018/0212420 A1    Jul. 26, 2018

Related U.S. Application Data

(60) Provisional application No. 62/448,892, filed on Jan. 20, 2017.

(51) Int. Cl.

| H02H 7/22 | (2006.01) |
| H02H 1/00 | (2006.01) |
| H02J 5/00 | (2016.01) |
| H02J 4/00 | (2006.01) |
| H02H 3/20 | (2006.01) |
| H02H 5/04 | (2006.01) |
| H02J 7/00 | (2006.01) |
| H02G 3/08 | (2006.01) |
| H02H 3/16 | (2006.01) |

(52) U.S. Cl.
CPC ............ *H02H 7/22* (2013.01); *H02H 1/0007* (2013.01); *H02H 3/20* (2013.01); *H02H 3/202* (2013.01); *H02H 5/04* (2013.01); *H02J 4/00* (2013.01); *H02J 5/00* (2013.01); *H02G 3/08* (2013.01); *H02H 3/16* (2013.01); *H02J 7/0042* (2013.01)

(58) Field of Classification Search
USPC ............................................. 307/26, 45, 53
See application file for complete search history.

(56) References Cited

U.S. PATENT DOCUMENTS

| 5,477,091 A | 12/1995 | Fiorina et al. |
| 6,560,131 B1 * | 5/2003 | vonBrethorst ........ H02J 7/0042 |
| | | 361/673 |
| 2007/0279166 A1 | 12/2007 | VanderVeen |

(Continued)

OTHER PUBLICATIONS

ABB, "ABB circuit-breakers for direct current applications," *5QT Technical Application Papers*, Sep. 2007, ABB.

(Continued)

*Primary Examiner* — Danny Nguyen
(74) *Attorney, Agent, or Firm* — Alston & Bird LLP

(57) ABSTRACT

A method selects between AC and DC power inputs for delivery to power distribution circuits in a building. Power distribution circuits includes power distribution wiring and a socket. Power distribution wiring connects between the socket and a circuit breaker and is selectively coupled through the circuit breaker to either the AC or DC power input. DC and AC power inputs, and the circuit breaker are dispositioned at a building service panel. The method includes monitoring a voltage level of the DC power input using a detection circuit in the circuit breaker, using a switch circuit in the circuit breaker to couple the power connection wiring to the AC power input when the detection circuit detects the voltage level is below a threshold level, and coupling the power connection wiring to the DC power input when the detection circuit detects the voltage level is equal to or above the threshold level.

57 Claims, 5 Drawing Sheets

(56) References Cited

U.S. PATENT DOCUMENTS

| | | |
|---|---|---|
| 2011/0235243 A1 | 9/2011 | Rus et al. |
| 2012/0043105 A1 | 2/2012 | Baird et al. |
| 2012/0212052 A1* | 8/2012 | Cyuzawa ............... H02J 3/02 307/26 |
| 2017/0229875 A1 | 8/2017 | Chen |

OTHER PUBLICATIONS

Square D by Schneider Electric, "NQ Circuit Breaker Panelboards," *Catalog 1640CT0801 2008 Class 1640*, Dec. 2008, Square D by Schneider Electric.

Larsen, "Backfeeding Ground Fault Circuit Breakers," *Electrical Shortz*, Jun. 2010, Document No. 0900DB1001 R02/12, Square D by Schneider Electric.

U.S. Appl. No. 15/389,187, Notice of Allowance dated Nov. 6, 2018.

* cited by examiner

SERVICE PANEL CIRCUIT FOR AUTOMATIC AC AND DC POWER DISTRIBUTION

CROSS-REFERENCES TO RELATED APPLICATIONS

This application claims priority, under 35 U.S.C. § 119(e), from U.S. Provisional Application No. 62/448,892, filed on Jan. 20, 2017, entitled "Service Panel Circuit for Automatic AC and DC Power Distribution," the contents of all of which is incorporated herein by reference in its entirety. This application is related to U.S. application Ser. No. 15/389,187, filed on Dec. 22, 2016, entitled "System for Local DC Power Distribution," the contents of all of which is incorporated herein by reference in its entirety.

BACKGROUND

The present invention relates to electrical power distribution, and more particularly, to a circuit that automatically distributes alternating current (AC) and direct current (DC) power in a building.

Electrical power to a building mainly uses AC power. AC power enters the house or building through a main service panel for distribution through existing AC distribution circuits including a wall socket, where that AC power is available to power electrical apparatus, devices or equipment. Sometimes one or more sub-panels are connected to the output of the main service panel to further distribute power to more wiring connections in the building.

Renewable energy resources, such as wind turbines, photovoltaic (PV) panels or solar panels, generate DC power. Typically, DC power generated at a building from such renewable energy resources is inverted into AC power, which is then sent through a power meter to the AC power grid. Later, the AC power may be withdrawn from the AC power grid through the power meter and the AC service panel for distribution through the existing AC distribution circuits.

Many electronic devices, such as laptop computers or cellular phones, require the use of DC power either for device operation or for battery charging through a power adaptor to convert the AC power delivered at a wall socket into DC power for the device use. The sequential inversion and conversion of DC power into AC power and then back again to DC power is an inefficient way to use energy.

Accordingly, there is a need to reduce electrical energy wasted due to the sequential inversion of DC power into AC power and then conversion back again to DC power for electronic devices.

SUMMARY

According to one embodiment of the present invention, a method to select between an AC power input and a DC power input for delivery to a multitude of power distribution circuits in a building is presented. A first one of the multitude of power distribution circuits includes a first power wire and a first socket. The first power wire is connected between the first socket and a first circuit breaker. The first power wire is selectively coupled through the first circuit breaker to either the AC power input or the DC power input. The DC power input, the AC power input, and the first circuit breaker are dispositioned at a service panel in the building. The method includes monitoring a voltage level of the DC power input using a detection circuit in the first circuit breaker, coupling the first power wire to the AC power input when the detection circuit detects the DC voltage level is below a threshold level using a switch circuit in the first circuit breaker, and coupling the first power wire to the DC power input when the detection circuit detects the DC voltage level is equal to or above the threshold level.

According to one embodiment, the method further includes disconnecting the AC power input from the first circuit breaker using an AC main breaker dispositioned at the service panel. According to one embodiment, the method further includes disconnecting the DC power input from the first circuit breaker using a DC main breaker dispositioned at the service panel. According to one embodiment, the multitude of power distribution circuits are adaptively coupled to the AC power input and the DC power input.

According to one embodiment, a second one of the multitude of power distribution circuits includes a second power wire and a second socket. The second power wire is connected between the second socket and a second circuit breaker. The second circuit breaker is dispositioned at the service panel. The method further includes coupling the first power wire to the AC power input while coupling the second power wire to the DC power input.

According to one embodiment, a second one of the multitude of power distribution circuits includes a second power wire and a second socket. The second power wire is connected between the second socket and a second circuit breaker. The second circuit breaker is dispositioned at the service panel. The method further includes coupling the first power wire to the DC power input when the detection circuit detects the DC voltage level is equal to or above the first threshold level while coupling the second power wire to the DC power input when the detection circuit detects the DC voltage level is equal to or above a second threshold level different from the first threshold level. According to one embodiment, the method further includes decoupling the DC power input from the first circuit breaker by disabling the detection circuit.

According to one embodiment, the first one of the multitude of power distribution circuits includes a second power wire connected between the first socket and the first circuit breaker. The method further includes coupling the second power wire to the AC power input when the detection circuit detects the DC voltage level is below the threshold level, and coupling the second power wire to the DC power input when the detection circuit detects the voltage level is equal to or above the first threshold level. According to one embodiment, the first power wire is an AC hot wire and the second power wire is a neutral wire. According to one embodiment, a first AC voltage on the first power wire is 180 degrees out of phase with a second AC voltage on the second power wire. According to one embodiment, the first power wire is at the same DC potential as the second power wire when the detection circuit detects the voltage level is equal to or above the first threshold level.

According to one embodiment, the method further includes monitoring, at the first circuit breaker, a power surge associated with the first power wire, automatically disconnecting the AC power input from the first circuit breaker when an AC power surge is detected, and automatically disconnecting the DC power input from the first circuit breaker when a DC power surge is detected. According to one embodiment, the first socket is disposed on the surface of a wall of the building.

According to one embodiment of the present invention, a circuit breaker includes a first terminal adapted to couple to an AC power input, a second terminal adapted to couple to a DC power input, and a third terminal adapted to couple to a first power wire of a power distribution circuit in a building. The first power wire is connected between a socket and the circuit breaker when the circuit breaker is installed in a service panel of the building. The circuit breaker further includes a detection circuit adapted to monitor a voltage level of the DC power input. The circuit breaker further includes a switch circuit adapted to couple the third terminal to the AC power input in a default condition when the detection circuit detects the voltage level is below a threshold level, and couple the third terminal to the DC power input when the detection circuit detects the voltage level is equal to or above the threshold level.

According to one embodiment, the switch circuit includes a single-pole double-throw relay. The single-pole double-throw relay includes a single pole coupled to the third terminal, a normally-closed first throw that is coupled to the AC power input, and a normally-open second throw coupled to the DC power input. According to one embodiment, the switch circuit further includes a power transistor configured to energize the single-pole double-throw relay in response to the detection circuit, and thereby couple the normally-open second throw to the DC power input.

According to one embodiment, the switch circuit includes at least two transistors configured as a single-pole double-throw switch. The single-pole double-throw switch includes a single pole coupled to the third terminal, a normally-closed first throw coupled to the AC power input, and a normally-open second throw coupled to the DC power input.

According to one embodiment, the circuit breaker further includes a fourth terminal adapted to connect to a second power wire of the power distribution circuit. The second power wire is connected between the socket and the circuit breaker. The switch circuit is further adapted to couple the fourth terminal to the AC power input in the default condition, and couple the fourth terminal to the DC power input when the detection circuit detects the voltage level is equal to or above the threshold level.

According to one embodiment, the first power wire is an AC hot wire and the second power wire is a neutral wire. According to one embodiment, a first AC voltage on the first power wire is 180 degrees out of phase with a second AC voltage on the second power wire. According to one embodiment, the first power wire is at the same DC potential as the second power wire when the detection circuit detects the voltage level is equal to or above the first threshold level.

According to one embodiment, the switch circuit includes a double-pole double-throw relay. The double-pole double-throw relay includes a first pole coupled to the third terminal, a second pole coupled to the fourth terminal, a normally-closed first throw coupled to the AC power input, and a normally-open second throw coupled to the DC power input.

According to one embodiment, the switch circuit further includes a power transistor configured to energize the double-pole double-throw relay in response to the detection circuit, and thereby couple the normally-open second throw to the DC power input. According to one embodiment, the switch circuit includes at least four transistors configured as a double-pole double-throw switch. The double-pole double-throw switch includes a first pole coupled to the third terminal, a second pole coupled to the fourth terminal, a normally-closed first throw coupled to the AC power input, and a normally-open second throw coupled to the DC power input.

According to one embodiment, the circuit breaker further includes a DC safety device coupled to the second terminal. The DC safety device is adapted to detect an abnormal surge at the second terminal, and causes the switch circuit to decouple the third terminal from the DC power input when the DC safety device detects the abnormal surge.

According to one embodiment, the circuit breaker further includes an AC safety device coupled to the first terminal. The AC safety device is adapted to detect an abnormal surge at the first terminal, and causes the switch circuit to decouple the third terminal from the AC power input when the AC safety device detects the abnormal surge.

According to one embodiment, the circuit breaker further includes a safety device coupled to the third terminal. The safety device is adapted to detect an abnormal surge at the third terminal, and decouple the first power wire from the circuit breaker when the safety device detects the abnormal surge. According to one embodiment, the switch circuit is adapted to receive an external input that configures the circuit breaker to be an AC circuit breaker. According to one embodiment, the service panel is an electric assembly adaptively switching between AC power input and DC power input for charging the energy storage device, such as a battery. According to one embodiment, a ground wire is connected between the service panel and a socket.

A better understanding of the nature and advantages of the embodiments of the present invention may be gained with reference to the following detailed description and the accompanying drawings.

DETAILED DESCRIPTION

Figure 1:
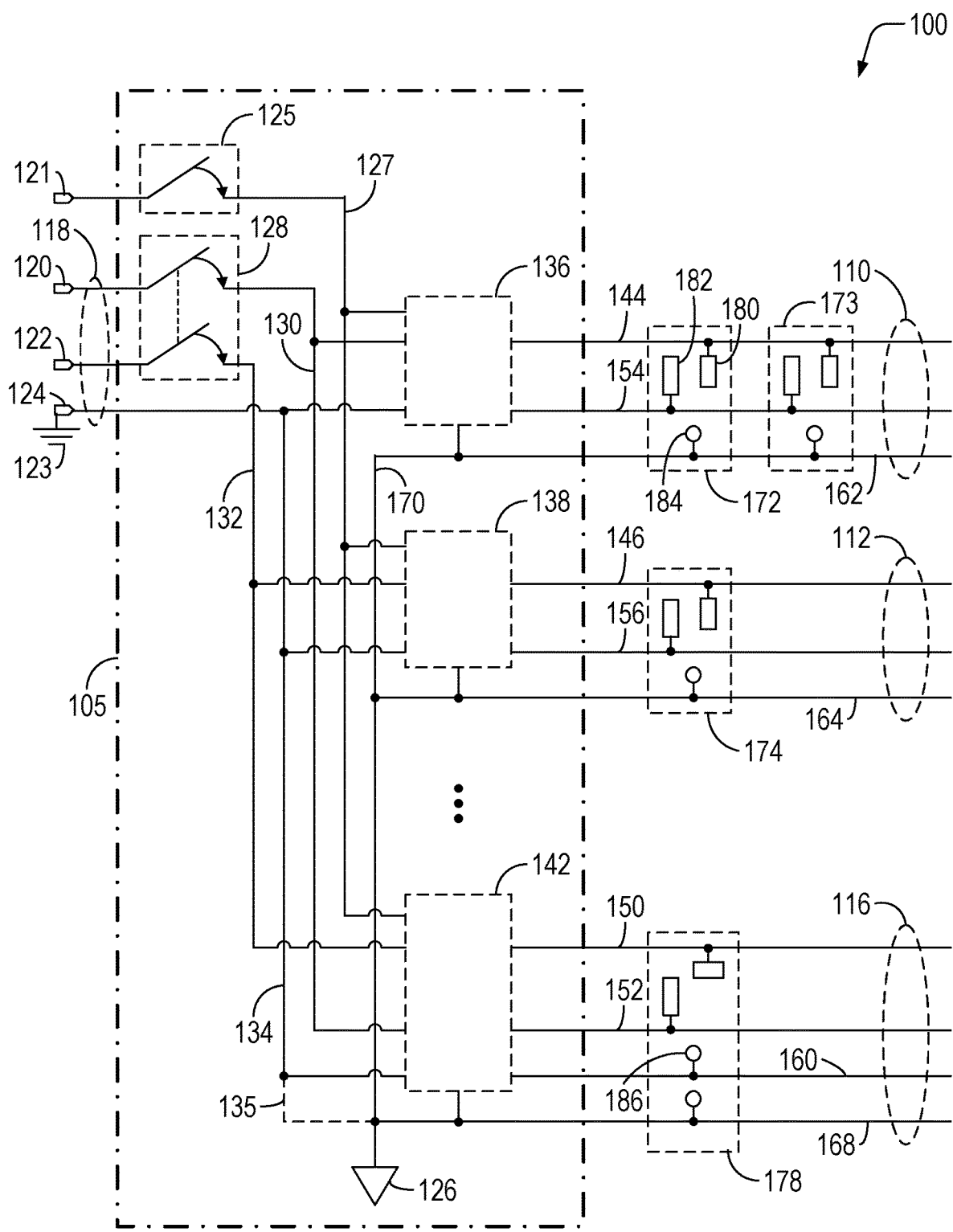
FIG. 1 depicts a simplified exemplary schematic of a service panel capable of adaptively distributing 240V AC, 120V AC, and DC power to selected ones of a multitude of existing AC distribution circuits in a building, in accordance with one embodiment of the present invention.

FIG. 1 depicts a simplified exemplary schematic 100 of a service panel 105 capable of adaptively distributing 240V AC, 120V AC, and DC power to selected ones of a multitude of existing AC distribution circuits 110, 112, 116 in a building, in accordance with one embodiment of the present invention. Embodiments of the present invention enable DC power to be distributed in the existing AC power distribution wiring infrastructure in a building directly, without sequential inversion to AC power and subsequent conversion back again to DC power, which saves electrical energy.

Although the nominal AC voltage is 120V AC, the national standards in the United States (US) and Canada allow a range of 114V to 126V (120V±5% RMS). Historically, 110V, 115V and 117V were used at different times and places in North America as well as 120V. Occasionally, people may speak of main power as 110V in US.

Different from the US, which uses two 180 degree out of phase hot wires for the 240V power, the 240V AC in United Kingdom (UK) may use single phase with one hot wire, one neutral, and one local ground. In the context of FIG. 1, common AC line 1 wire 130 may be the same as common AC line 2 wire 132 or connected together in the UK. Local ground is the connection to ground at the service panel location. Neutral is also an active current return path here. In Europe, the electrical power specifications are nominal 230V RMS AC with −10%+6% at 50 Hz. Although only specific voltages are referred in the description, the apparatus and embodiments are applicable to all voltage ranges and variations within the standard specifications and beyond.

In the US, neutral is not required for 240V AC circuit use and could be inactive for 240V AC in US. But it may be useful to wire the neutral at a 240V circuit in case it is needed. For example, stoves may use 240V for the heating elements but 120V for light bulbs. Neutral is used as a current return path for returning current from the hot wires and is active for 120V AC. Neutral and local ground are at zero or near zero voltage. Both neutral and local ground are tied to earth ground simply at different locations. Both panel 105 and sub-panel (not depicted) have local ground connection in the US, which is also output to respective power distribution circuits.

The electrical power distribution system to a house or a building is typically based on AC. AC power is supplied from an AC power source (not depicted), which is coupled from an AC power input 118 to enter the house or building through inputs of service panel 105. AC power may then be distributed from service panel 105 to the multitude of existing AC power distribution circuits 110, 112, 116 throughout the house or building. Sometimes, one or more sub-panels (not depicted) are connected to an output of service panel 105 to further distribute power to more wiring connections in the house or building.

In the context of the embodiments, the term "coupled" is used to describe an indirect electrical connection that may or may not include other electrical functional blocks in the connection path, which is in contrast to a direct electrical connection where one electrical element may be described as being connected to another electrical element such as by a wire or a multitude of wires with no other functional electrical blocks in the connection path.

In the United States (US), service panel 105 may provide both 120V AC and 240V AC power for local use. Service panel 105 may include AC power input 118, which in-turn may include two single-phase 60 Hz lines 120, 122, each carrying nominally 120V root-mean-square (RMS) AC voltage at 180 degrees out of phase to one another. In this context, the term "line" may also be referred to herein as "hot" and should not to be confused with the generic term "wire." AC power input 118 may further include a neutral wire 124. In some examples, neutral wire 124 may be connected to an earth ground 123 at a nearby power post (not depicted).

Service panel 105 may further include a DC power input 121, adapted to receive DC power from one of a multitude of DC power sources (not depicted), such as for example a solar panel, a wind turbine, a high capacity battery, and/or the like. In one example, the DC power source may be installed on a rooftop of the building. A power storage device, such as a battery, can store DC power generated by the renewable energy sources, such as wind or sun light, whenever available, and outputs the DC power for use until the energy stored in the energy storage device becomes depleted below a certain level or used up. In such case, the power required to operate the devices connected to an existing AC distribution circuit is higher than the DC power source can provide, then the AC power source can still be used at the discretion of a user.

Service panel 105 may further include an AC main breaker 128, a common AC line 1 wire 130, a common AC line 2 wire 132, a common neutral wire 134, and a common ground wire 170. Neutral wire 124 of AC power input 118 may be connected to common neutral wire 134, which in-turn may be connected through a connection 135 to local ground 126 near service panel 105. Common ground wire 170 is connected to local ground 126. AC main breaker 128 is optional, and may be used to manually control the AC power input to service panel 105. AC main breaker 128 may be connected between the single-phase 60 Hz lines 120, 122 and the common AC line 1/2 wires 130, 132. Both single-phase 60 Hz line inputs are typically connected or disconnected simultaneously. The service panel is operative to connect or disconnect the AC power source from the building using AC main breaker 128. When AC main breaker 128 is closed, common AC line 1 wire 130, common AC line 2 wire 132, and common neutral wire 134 are coupled to the AC power source that supplies AC power to service panel 105 and the building through AC power input 118.

Service panel 105 may further include a DC main breaker 125 connected between DC power input 121 and a common DC power wire 127. DC main breaker 125 is also optional and may be configured to connect/disconnect common DC power wire 127 from DC power input 121. The service panel is further operative to connect or disconnect the DC power source from the building using DC main breaker 125. Therefore, common DC power wire 127 is coupled to the DC power source that supplies DC power to service panel 105 and the building through DC power input 121.

Service panel 105 may further include one or more of 120V AC/DC circuit breaker circuits 136, 138 and/or one or more 240V AC/DC circuit breaker circuit 142. 120V AC/DC circuit breaker circuits 136, 138 and 240V AC/DC circuit breaker circuit 142 are each connected to common DC power wire 127, common neutral wire 134, common ground wire 170, common AC line 1 wire 130 and/or common AC line 2 wire 132. 120V AC/DC circuit breaker circuits 136, 138 and 240V AC/DC circuit breaker circuit 142 may be configured to physically replace existing legacy circuit breakers installed at service panel 105. As will be described in more detail below, 120V AC/DC circuit breaker circuits 136, 138 and 240V AC/DC circuit breaker circuit 142 are configured to adaptively select between AC and DC power delivery to selected ones of the multitude of existing AC distribution circuits 110, 112, 116 in the building when 120V AC/DC circuit breaker circuits 136, 138 and 240V AC/DC circuit breaker circuit 142 are installed at service panel 105. Common DC power wire 127, common AC line 1 wire 130, common AC line 2 wire 132, common neutral wire 134, common ground wire 170, 120V AC/DC circuit breaker circuits 136, 138, and/or one or more 240V AC/DC circuit breaker circuit 142 may be dispositioned at service panel 105 in the home or building.

Existing AC power distribution circuits 110, 112 may be configured to nominally distribute 120V AC power or DC power and may respectively include a single AC hot wire 144, 146. Existing AC power distribution circuit 116 may be configured to nominally distribute 240V AC power or DC power and may include two AC hot wires 150, 152. In this context, one of AC hot wires 144, 146, 150, 152 may also be referred to herein generally as a "power connection wire." Existing AC power distribution circuits 110, 112, 116 may further respectively include an AC neutral wire 154, 156, 160 configured to carry return current in the power distribution path in some embodiments to be described below. Existing AC power distribution circuits 110, 112, 116 may further respectively include a ground wire 162, 164, 168 each connected to common ground wire 170 at service panel 105. In some countries or in older standards, ground may not be included in the AC power distribution circuits 110, 112, 116. Existing AC power distribution circuits 110, 112, 116 may further respectively include one of a multitude of sockets, hereinafter also referred to as outlets, 172, 173, 174, 178 respectively.

Each one of the multitude of sockets 172, 173, 174, 178 may be disposed on the surfaces of one or more walls of the building. Each existing socket may include one slot 180 connected to an associated AC hot wire, such as for example AC hot wire 144, another slot 182 connected to an associated AC neutral wire, such as AC neutral wire 154, and a ground slot 184 connected to an associated ground wire, such as ground wire 162. Socket 178 may include a pair of slots connected respectively to two AC hot wires 150, 152 and a connection 186 to neutral wire 160.

120V AC/DC circuit breaker circuits 136, 138 and/or 240V AC/DC circuit breaker circuit 142 may each respectively be associated with and may be used to respectively gate power delivery to a different associated one of the multitude of existing AC power distribution circuits 110, 112, 116. As will be described in further detail below, each 120V AC/DC circuit breaker circuits 136, 138 are configured to adaptively couple AC hot wire 144, 146 respectively, through the associated different 120V AC/DC circuit breaker circuits 136, 138 to either common DC power wire 127, common AC line 1 wire 130, or common AC line 2 wire 132, in response to the voltage level on common DC power wire 127. Analogously, each 240V AC/DC circuit breaker circuit 142 are configured to couple AC hot wires 150, 152 through the associated 240V AC/DC circuit breaker circuit 142 to either common DC power wire 127, or common AC line 1 wire 130 and common AC line 2 wire 132, in response to the voltage level on common DC power wire 127.

As will be described in further detail below, each 120V AC/DC circuit breaker circuits 136, 138, are configured to respectively couple AC neutral wire 154, 156, 160 through the associated different 120V AC/DC circuit breaker circuits 136, 138 to either common DC power wire 127 or common neutral wire 134. 240V AC/DC circuit breaker circuit 142 is configured to respectively couple AC neutral wire 160 through the associated 240V AC/DC circuit breaker circuit 142 to common neutral wire 134.

In one embodiment, DC power may be selectively delivered to one of the multitude of existing AC distribution circuits 110, 112, 116 by connecting that selected existing AC distribution circuit 110, 112, 116 to one of the 120V AC/DC circuit breaker circuits 136, 138 or the 240V AC/DC circuit breaker circuit 142 at service panel 105 as depicted with the DC level detection capability being included in circuit breakers 136, 138, 142. Simultaneously, another one of the multitude of existing AC distribution circuits may be connecting to a legacy circuit breaker at service panel 105 for dedicated AC power distribution (not depicted).

For example, existing AC power distribution circuit 110 includes AC hot wire 144 and socket 172. A second one of the multitude of existing AC power distribution circuits includes a second AC hot wire and a second socket (not depicted). AC hot wire 144 may be initially connected between socket 172 and a first legacy circuit breaker (not depicted). The second AC hot wire is initially connected between the second socket and a second legacy circuit breaker. AC hot wire 144 is initially connected through the first legacy circuit breaker to common AC line wire 130. The second AC hot wire is initially connected through the second legacy circuit breaker to common AC line wire 132.

Recall, common AC line wire 130 and common AC line wire 132 are coupled to the AC power source that supplies AC power to the building. The first legacy circuit breaker (not depicted) may be replaced with 120V AC/DC circuit breaker circuit 136 as depicted, which connects 120V AC/DC circuit breaker circuit 136 between common AC line wire 130 and AC hot wire 144. 120V AC/DC circuit breaker circuit 136 is further connected between common DC power wire 127 and AC hot wire 144. As will be described in further detail below, replacing the legacy circuit breaker with 120V AC/DC circuit breaker circuit 136 at service panel 105 enables 120V AC/DC circuit breaker circuit 136 to adaptively deliver DC power to AC hot wire 144 in response to the voltage level on common DC power wire 127, while keeping AC power delivery unchanged to the second one of the multitude of existing AC power distribution circuits which remains connected to the legacy circuit breaker.

Embodiments of the present invention leverage the existing legacy electrical wiring infrastructure, such as existing power distribution circuits 110, 112 and 116 and the existing sockets 172, 173, 174, 178 connected to the power distribution circuits 110, 112, and 116 for DC power distribution in a building when the DC power source is available, and switch back to the AC power source for use when there is not sufficient DC power available. The embodiments enable delivery of DC power on the same existing wiring infrastructure, e.g. existing AC distribution circuits 110, 112, 116, and enable the co-existence of both AC and DC power distribution, by automatically switching at service panel 105 between AC or DC power in accordance with the availability of DC power at the building. Because existing AC distribution circuits 110, 112, 116 are leveraged or remain unchanged, and because the changes to existing electrical power infrastructure are performed at service panel 105 and at its inputs, the embodiments are convenient to implement.

Figure 2:
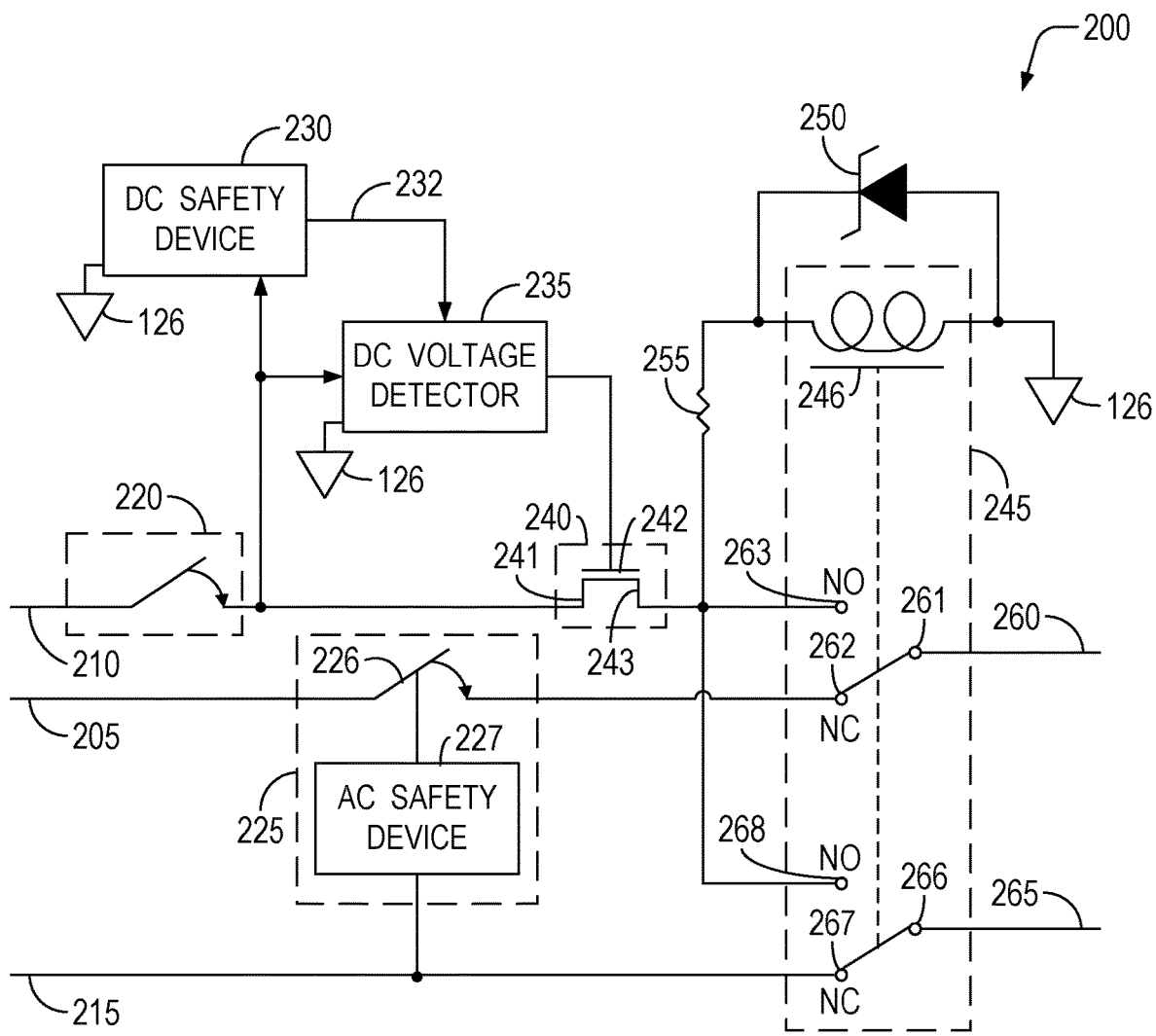
FIG. 2 depicts a simplified exemplary schematic of a 120V AC/DC circuit breaker circuit configured to adaptively select between an AC power input and a DC power input for delivery of AC power or DC power to an AC hot wire and an AC neutral wire as depicted in FIG. 1, in accordance with one embodiment of the present invention.

FIG. 2 depicts a simplified exemplary schematic of a 120V AC/DC circuit breaker circuit 200 configured to adaptively select between AC power input 118 and DC power input 121 for delivery of AC power or DC power to AC hot wire 144 and AC neutral wire 154 as depicted in FIG. 1, in accordance with one embodiment of the present invention. Referring simultaneously to FIGS. 1 and 2, 120V AC/DC circuit breaker circuit 200 may correspond to 120V AC/DC circuit breaker circuit 136 and/or to 120V AC/DC circuit breaker circuit 138. 120V AC/DC circuit breaker circuit 200 includes an AC line terminal 205 adapted to couple to AC power input 118 by connecting to either common AC line 1 wire 130 or common AC line 2 wire 132 at service panel 105, in accordance with the disposition of 120V AC/DC circuit breaker circuit 200 in service panel 105.

120V AC/DC circuit breaker circuit 200 further includes a DC terminal 210 adapted to couple to DC power input 121 by connecting to DC power wire 127 at service panel 105. 120V AC/DC circuit breaker circuit 200 further includes an AC neutral terminal 215 adapted to couple to neutral wire 124 by connecting to common neutral wire 134 at service panel 105. 120V AC/DC circuit breaker circuit 200 further includes a terminal adapted to connect at service panel 105 to common ground wire 170, which in-turn is coupled to local ground 126.

120V AC/DC circuit breaker circuit 200 further includes a single-pole switch 220, an AC safety circuit 225, a DC safety device 230, a DC voltage detector circuit 235, a DC power transfer device 240, hereinafter also referred to as a transfer gate, a double-pole double-throw (DPDT) relay 245, an optional Zener diode 250, and a current limiting resistor 255. 120V AC/DC circuit breaker circuit 200 further includes two power output wires, a power output wire 260 adapted to couple to AC hot wire 144 and a neutral output wire 265 adapted to couple to AC neutral wire 154. DC safety device 230 and DC voltage detector circuit 235 include local ground 126 connections. Single-pole switch 220 can be controlled manually to enable the DC power input to selected individual 120V AC/DC circuit breaker circuit 200, e.g. 120V AC/DC circuit breaker circuit 136, in service panel 105. When single-pole switch 220 is switched off, then only AC power will be output from 120V AC/DC circuit breaker circuit 200.

DPDT relay 245 includes a coil 246, a switch pole 1 common terminal 261, a switch pole 1 normally closed (NC) terminal 262, and a switch pole 1 normally open (NO) terminal 263. DPDT relay 245 further includes a switch pole 2 common terminal 266, a switch pole 2 NC terminal 267, and a switch pole 2 NO terminal 268. In one embodiment, DPDT relay 245 may be replaced by four transistors configured to emulate the functions of DPDT relay 245.

AC safety circuit 225 may include a single-pole AC switch 226 that is normally left closed to connect AC power from AC line terminal 205 to switch pole 1 NC terminal 262. AC safety device 227 is configured to monitor, at the service panel, a power surge and/or abnormal thermal condition associated with at least one power connection wire, e.g. AC hot wire 144, at AC line terminal 205 and/or at AC neutral terminal 215.

When an AC power surge and/or abnormal thermal condition is detected, AC safety device 227 is configured to open single-pole AC switch 226 to automatically disconnect AC line terminal 205 from switch pole 1 NC terminal 262. By opening single-pole AC switch 226, AC safety circuit 225 is further configured to automatically disconnect at least one power connection wire, e.g. AC hot wire 144 coupled to power output wire 260, from AC power input 118 that is coupled to AC line terminal 205, when the power surge and/or abnormal thermal condition is detected. In one embodiment, AC safety device 227 may include a thermal bimetallic stripe or ground fault circuit interrupter (GFCI). In one embodiment, single-pole AC switch 226 may be manually opened or closed to control AC power delivery to existing AC distribution circuit 110. AC neutral terminal 215 is connected to switch pole 2 NC terminal 267 and to AC safety device 227.

Single-pole switch 220 is NC to connect DC terminal 210 to inputs of DC safety device 230, DC voltage detector circuit 235, and a first current carrying terminal 241 of DC power transfer device 240. An output 232 of DC safety device 230 is coupled to an input of DC voltage detector circuit 235. An output of DC voltage detector circuit 235 is coupled to a control gate 242 of DC power transfer device 240. In one embodiment, DC power transfer device 240 may be a power metal oxide semiconductor (MOS) transistor as depicted. In another embodiment, DC power transfer device 240 may be a power bipolar transistor (not depicted).

A second current carrying terminal 243 of DC power transfer device 240 is coupled to switch pole 1 NO terminal 263, switch pole 2 NO terminal 268, and one terminal of coil 246 through series-connected current limiting resistor 255. Another terminal of coil 246 is coupled to local ground 126. A positive terminal of Zener diode 250 is coupled to local ground 126 and the grounded terminal of coil 246. A negative terminal of Zener diode 250 is coupled to the ungrounded terminal of coil 246 and current limiting resistor 255. Zener diode 250 is coupled across coil 246 to protect DPDT relay 245 during relay switching. Switch pole 1 common terminal 261 is coupled to power output wire 260. Switch pole 2 common terminal 266 is coupled to neutral output wire 265.

DC power may not be available all the time from DC power input 121 at DC terminal 210. For example, a local solar panel may only produce DC power during daylight and not at night. Although the DC power generated from the renewable energy sources, such as sun light, can be stored in an energy storage device, such as a battery, and be directly output to service panel 105 for use when the DC power is available, the energy in the energy storage device can still be depleted occasionally. However, AC power is usually available most of the time from the AC power grid at AC power input 118. Therefore, it may be advantageous to adaptively select between AC power input 118 and DC power input 121 for delivery of electrical power to the multitude of existing AC distribution circuits 110, 112, 116 in the building.

DC voltage detector circuit 235 is adapted to monitor a DC voltage level of DC power input 121 as described below. When single-pole switch 220 is closed, a DC voltage level of DC power input 121 coupled to first current carrying terminal 241 is monitored by DC voltage detector circuit 235 in 120V AC/DC circuit breaker circuit 200. The output of DC voltage detector circuit 235 is responsive to the monitored DC voltage level of DC power input 121 to control the gate 242 of DC power transfer device 240. In other words, DC voltage detector circuit 235 includes a voltage sensing device to control the coupling of DC power input 121 to the switch circuit, e.g. switch pole 1 NO terminal 263 and switch pole 2 NO terminal 268, of DPDT relay 245.

When 120V AC/DC circuit breaker circuit 200 is installed and electrically connected in service panel 105, then at least one power connection wire, e.g. AC hot wire 144, is connected between socket 172 and 120V AC/DC circuit breaker circuit 200. Further, the at least one power connection wire, e.g. AC hot wire 144, is selectively coupled through the 120V AC/DC circuit breaker circuit 200 to either AC power input 118 or DC power input 121.

When DC power is not sufficiently available for use, then DC voltage detector circuit 235 detects the DC voltage level coupled from DC power input 121 is below a threshold DC voltage level. Then, the output of DC voltage detector circuit 235 turns off or tri-states DC power transfer device 240 to cut off current flow through coil 246 such that DPDT relay 245 has both switch poles in the default NC position. In the NC position, DPDT relay 245 connects AC line terminal 205 and AC neutral terminal 215 to power output wire 260 and neutral output wire 265 respectively. That is, at least one power connection wire, e.g. AC hot wire 144, is coupled to AC power input 118 when DC voltage detector circuit 235 detects the DC voltage level coupled from DC power input 121 is below the threshold DC voltage level using DPDT relay 245 as a switch circuit in 120V AC/DC circuit breaker circuit 200.

In contrast, when DC power is sufficiently available for use, then DC voltage detector circuit 235 detects the DC voltage level coupled from DC power input 121 is equal to or above the threshold DC voltage level. Then, the output of DC voltage detector circuit 235 turns on DC power transfer device 240 to enable current flow through coil 246 to energize DPDT relay 245, which switches both switch poles to the NO position. In the NO position, DPDT relay 245 connects DC terminal 210 to power output wire 260 and neutral output wire 265. The threshold DC voltage level can be set or predetermined by the user in accordance with the application requirements.

When 120V AC/DC circuit breaker circuit 200 is installed and connected in service panel 105, at least one power connection wire, e.g. AC hot wire 144, is coupled to DC power input 121 when DC voltage detector circuit 235 detects the DC voltage level coupled from DC power input 121 is equal to or above the threshold DC voltage level using DPDT relay 245 as a switch circuit in 120V AC/DC circuit breaker circuit 200.

Accordingly, DPDT relay 245 is adapted to couple the at least one power output wire 260 to AC power input 118 in a default condition. DPDT relay 245 is further adapted to couple the at least one power output wire 260 to DC power input 121 when the DC voltage detector circuit 235 detects the monitored DC voltage level is equal to or above the threshold level.

In other words, when DC voltage detector circuit 235 detects the DC voltage level coupled from DC power input 121 is equal to or above the threshold DC voltage level, then 120V AC/DC circuit breaker circuit 200 converts existing AC power distribution circuit 110 from an AC power distribution circuit to a DC power distribution circuit by coupling DC power to both AC hot wire 144 and AC neutral wire 154. Coupling DC power to both AC hot wire 144 and AC neutral wire 154 is advantageous in existing wiring installations where socket 172 uses three terminals, e.g. hot, neutral, and ground, which provides both safety and user friendliness features. Then, users need not have to differentiate if the DC power is available at the hot terminal or at the neutral terminal of socket 172, and thus will not suffer a wrong polarity problem. For example, if a user plugs any AC device, such as an AC to DC power adapter, having just two plug terminals, e.g. hot and neutral, into socket 172, there will be no power short problems because the hot and neutral terminals are at the same DC potential.

It is noted that the selection of AC power or DC power delivery to AC power distribution circuit 110 is not only automatic but in accordance with the monitored DC voltage level of DC power input 121 and the predetermined threshold DC voltage level, besides the optional manual control features, such as the single-pole switch 220. Therefore, 120V AC/DC circuit breaker circuit 200 adaptively selects between an AC power input and a DC power input for delivery to each of the multitude of power distribution circuits 110, 112, 116 in the building by adapting to the availability of useable DC power. In one embodiment, 120V AC/DC circuit breaker circuit 138 may couple another power connection wire, e.g. AC hot wire 146, to DC power input 121 when DC voltage detector circuit 235 detects the DC voltage level is equal to or above another predetermined DC threshold level, e.g. 12V, 24V or higher, different from the threshold level, e.g. 5V, for selecting DC power distribution to AC hot wire 144.

DC safety device 230 may disable DC voltage detector circuit 235, which then turns off DC power transfer device 240. DC safety device 230 is configured to monitor, at the service panel at DC terminal 210, a power surge and/or abnormal thermal condition associated with at least one power connection wire, e.g. AC hot wire 144 coupled to power output wire 260 and coupled in-turn to DC terminal 210 when DPDT relay 245 is energized. In one embodiment, DC safety device 230 is configured to detect DC overvoltage or DC surge current.

When an DC power surge and/or abnormal thermal condition is detected, DC safety device 230 is configured to disable DC voltage detector circuit 235 to automatically turn off DC power transfer device 240, thereby disconnecting DC terminal 210 from switch pole 1 NO terminal 263 and from switch pole 2 NO terminal 268. When DC power transfer device 240 is turned off, DPDT relay 245 is also de-energized returning both switch poles to their default NC position. By turning off DC power transfer device 240, DC safety device 230 is further configured to automatically disconnect at least one power connection wire, e.g. AC hot wire 144 coupled to power output wire 260 and AC neutral wire 154 coupled to neutral output wire 265, from DC power input 121 that is coupled to DC terminal 210, when the power surge and/or abnormal thermal condition is detected.

When single-pole switch 220 is opened, DC voltage detector circuit 235 turns off DC power transfer device 240 and DPDT relay 245 is de-energized returning both switch poles to their default NC position. Thereby, a user or other circuit may select AC power delivery to AC power distribution circuit 110 even when DC power is available for use.

Figure 3:
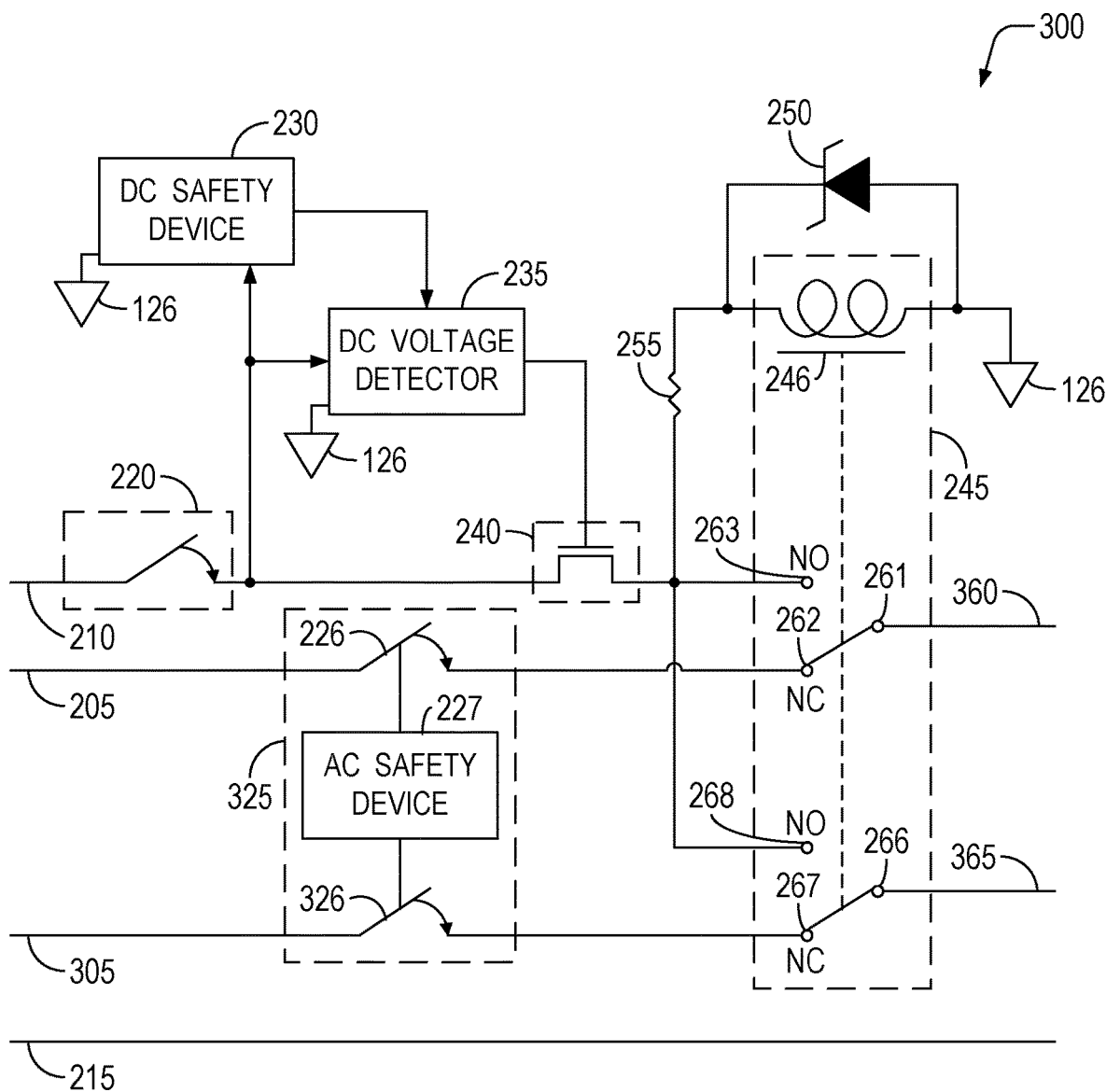
FIG. 3 depicts a simplified exemplary schematic of a 240V AC/DC circuit breaker circuit configured to adaptively select between the AC power input and the DC power input for delivery of AC power or DC power to two AC hot wires as depicted in FIG. 1, in accordance with one embodiment of the present invention.

FIG. 3 depicts a simplified exemplary schematic of a 240V AC/DC circuit breaker circuit 300 configured to adaptively select between AC power input 118 and DC power input 121 for delivery of AC power or DC power to two AC hot wires 150, 152 as depicted in FIG. 1, in accordance with one embodiment of the present invention. Referring simultaneously to FIGS. 1, 2 and 3, 240V AC/DC circuit breaker circuit 300 includes the same elements and functions as 120V AC/DC circuit breaker circuit 200 with the following exceptions. 240V AC/DC circuit breaker circuit 300 may correspond to 240V AC/DC circuit breaker circuit 142. AC neutral terminal 215 is not connected to switch pole 2 NC terminal 267, but is instead configured to connect directly to neutral wire 160 when 240V AC/DC circuit breaker circuit 300 is installed and electrically connected in service panel 105.

240V AC/DC circuit breaker circuit 300 includes an AC line terminal 305 adapted to couple to AC power input 118 by connecting to either common AC line 1 wire 130 or common AC line 2 wire 132 at service panel 105 so long as the phase of the AC power at AC line terminal 305 is 180 degree out of phase with the AC power at AC line terminal 205, in accordance with the disposition of 240V AC/DC circuit breaker circuit 300 in service panel 105. Accordingly 240V nominal AC power is available across AC line terminal 205 and AC line terminal 305.

240V AC/DC circuit breaker circuit 300 includes an AC safety circuit 325, which includes the same elements and functions as AC safety circuit 225, except AC safety circuit 325 includes a second single-pole AC switch 326 that is responsive to AC safety device 227 in the same way as single-pole AC switch 226. Single-pole AC switch 326 is normally left closed to connect AC power from an AC line terminal 305 to switch pole 2 NC terminal 267. Similarly, single-pole AC switch 226 is also normally closed to connect AC power from AC line terminal 205 to switch pole 1 NC terminal 262. Switch pole 1 common terminal 261 is connected to power output wire 360 adapted to couple to AC hot wire 150. Switch pole 2 common terminal 266 is connected to power output wire 365 adapted to couple to AC hot wire 152.

AC safety device 227 is configured to monitor, at the service panel, a power surge and/or abnormal thermal condition associated with at least one power connection wire, e.g. power output wires 360 and 365, at AC line terminal 205 and/or at AC line terminal 305. When an AC power surge and/or abnormal thermal condition is detected, AC safety device 227 is configured to open both single-pole AC switch 226 and single-pole AC switch 326 to automatically disconnect AC line terminal 305 from switch pole 2 NC terminal 267 and respectively disconnect AC line terminal 205 from switch pole 1 NC terminal 262. By opening both single-pole AC switch 226 and single-pole AC switch 326, AC safety circuit 325 is further configured to automatically disconnect AC hot wire 150 coupled to power output wire 360 and disconnect AC hot wire 152 coupled to power output wire 365, thereby disconnecting 240V AC power from existing AC power distribution circuit 116.

When DC power input 121 is below the predetermined threshold DC voltage level, DPDT relay 245 is in the NC position and connects AC line terminal 205 and AC line terminal 305 to power output wire 360 and power output wire 365 respectively, thereby delivering 240V AC power to existing AC power distribution circuit 116. When DC power input 121 is equal to or above the threshold DC voltage level, DPDT relay 245 energizes and switches to the NO position to disconnect power output wire 360 and power output wire 365 from AC line terminal 205 and AC line terminal 305 respectively and couples both power output wire 360 and power output wire 365 to DC terminal 210. Accordingly DC power is automatically delivered to existing AC power distribution circuit 116 instead of 240V AC power.

DC safety device 230 is configured to monitor, at the service panel at DC terminal 210 and at power output wires 360, 365, for a DC power surge and/or abnormal thermal condition, when DPDT relay 245 is energized to connect DC power to the output of 240V AC/DC circuit breaker circuit 300. When an DC power surge and/or abnormal thermal condition is detected, DC safety device 230 will trigger DC voltage detector 235 to shut off the DC power transfer device 240 and at the meantime also to shut off the AC power input by opening single-pole AC switches 226, 326 to prevent the AC power from connecting to the power output wires 360, 365 of 240V AC/DC circuit breaker circuit 300. 240V AC/DC circuit breaker circuit 300 is configured to automatically disconnect AC line terminal 205 from power output wire 360 and AC line terminal 305 from power output wire 365, and DC terminal 210 when the DC power surge or abnormality occurs.

Figure 4:
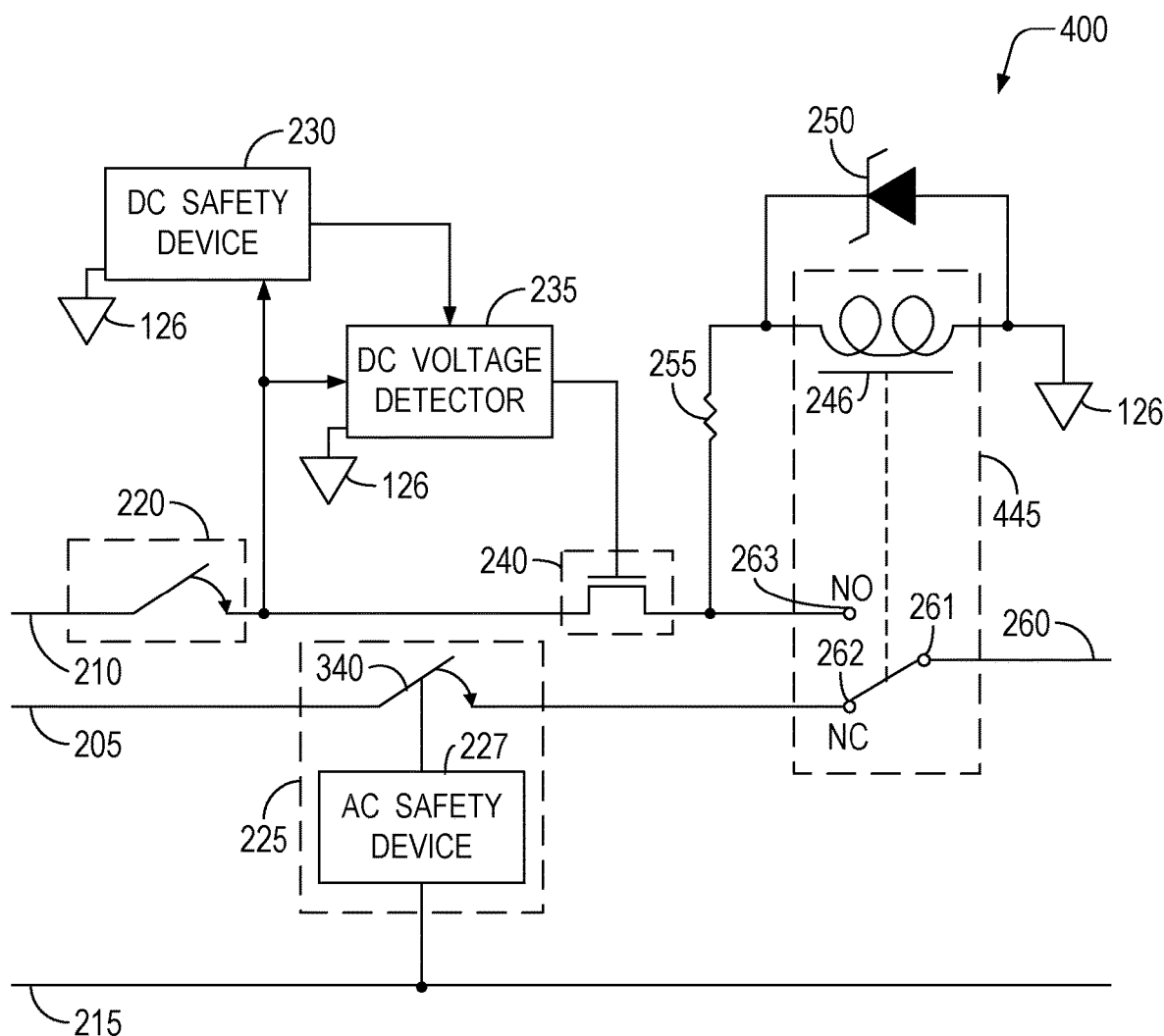
FIG. 4 depicts a simplified exemplary schematic of a 120V AC/DC circuit breaker configured to adaptively select between the AC power input and the DC power input for delivery of DC power to a single AC hot wire of one of the multitude of power distribution circuits as depicted in FIG. 1, in accordance with one embodiment of the present invention.

FIG. 4 depicts a simplified exemplary schematic of a 120V AC/DC circuit breaker 400 that uses a single-pole, double-throw (SPDT) relay to implement the automatic power switching function between AC power and DC power. The output wire 260 at the output of circuit breaker 400 and neutral 215 form a legacy AC distribution circuit in some countries. The circuit breaker 400 is configured to adaptively select between one of either AC power inputs 120, 122 and DC power input 121, for delivery of AC power or DC power to a single AC hot wire 144 of one of the multitude of power distribution circuits as depicted in FIG. 1, in accordance with one embodiment of the present invention. Referring simultaneously to FIGS. 1, 2 and 4, 120V AC/DC circuit breaker circuit 400 includes the same elements and functions as the DPDT 120V AC/DC circuit breaker circuit 200 with the following exceptions. In this embodiment, 120V AC/DC circuit breaker 400 may be installed and electrically connected in service panel 105 when the socket and/or associated existing AC power distribution circuit do not include a ground wire, e.g. ground wire 162, and e.g. the socket includes only two terminals instead of three.

DPDT relay 245 is replaced by a SPDT relay 445 that eliminates switch pole 2 common terminal 266, switch pole 2 NC terminal 267, and switch pole 2 NO terminal 268. AC neutral terminal 215 is not connected to switch pole 2 NC terminal 267, but is instead configured to connect directly to neutral wire 154 when 120V AC/DC circuit breaker circuit 400 is installed and electrically connected in service panel 105. When DC power input 121 is equal to or above the threshold DC voltage level, SPDT relay 445 energizes and switches to the NO position to disconnect power output wire 260 from AC line terminal 205 and couples power output wire 260 to DC terminal 210, while AC neutral terminal 215 remains coupled to local ground 126 at service panel 105. In one embodiment, SPDT relay 445 may be replaced by two transistors and an optional Zener diode design emulating the function of SPDT relay 445

Figure 5:
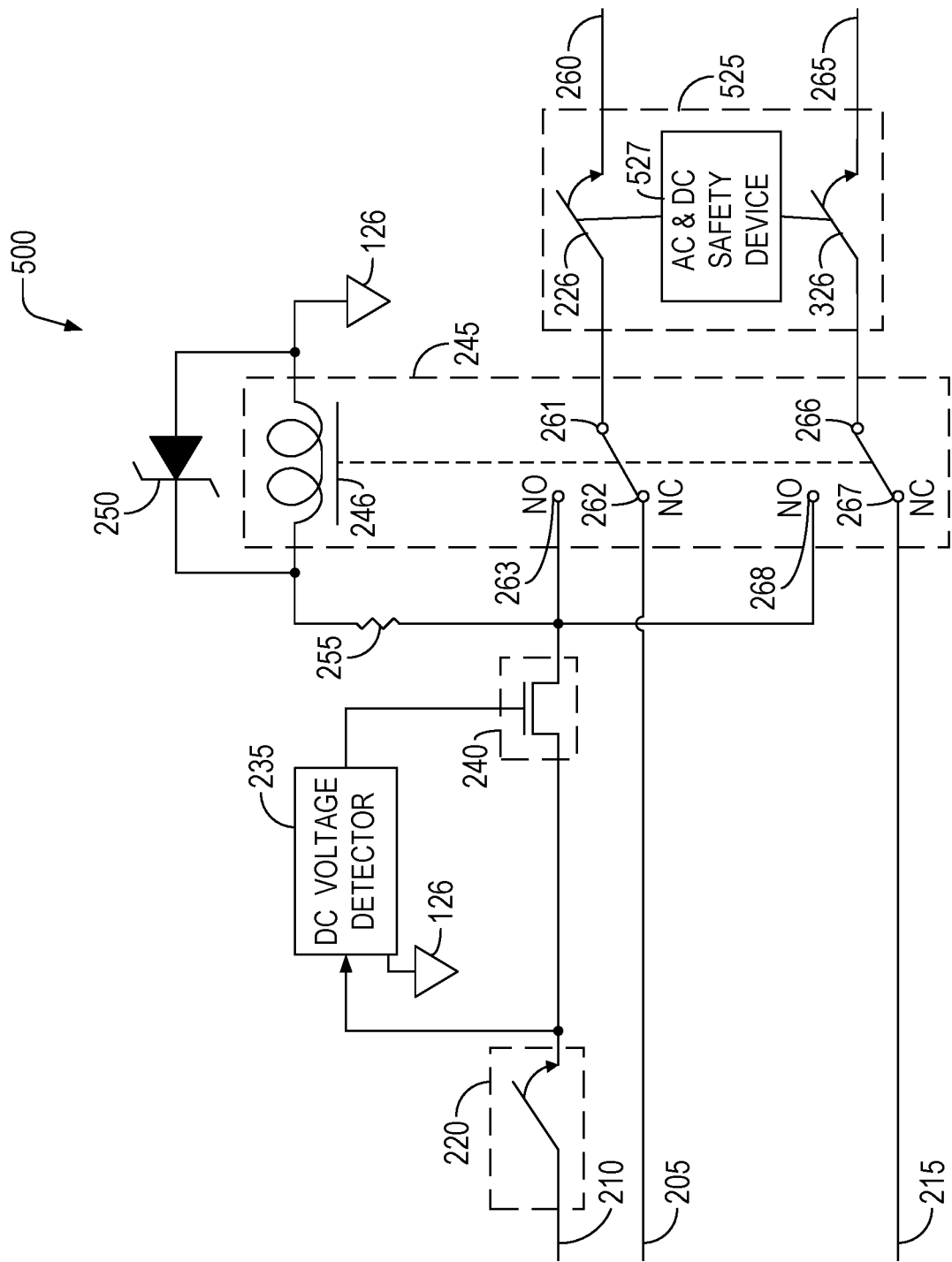
FIG. 5 depicts a simplified exemplary schematic of a 120V AC/DC circuit breaker configured to adaptively select between the AC power input and the DC power input for delivery of DC power to the hot wire and the neutral wire as depicted in FIG. 1 including a combined AC and DC safety circuit, in accordance with one embodiment of the present invention.

FIG. 5 depicts a simplified exemplary schematic of a 120V AC/DC circuit breaker 500 configured to adaptively select between AC power input 118 and DC power input 121 for delivery of DC power to AC hot wire 144 and AC neutral wire 154 as depicted in FIG. 1 including a combined AC and DC safety circuit 525, in accordance with one embodiment of the present invention. Referring simultaneously to FIGS. 1, 2 and 5, 120V AC/DC circuit breaker circuit 500 includes the same elements and functions as 120V AC/DC circuit breaker circuit 200 with the following exceptions. DC safety device 230 is eliminated and functions of DC safety device 230 and AC safety device 227 are merged into a combined AC and DC safety device 527 included in combined AC and DC safety circuit 525.

AC line terminal 205 is connected directly to switch pole 1 NC terminal 262 and AC neutral terminal 215 is connected directly to switch pole 2 NC terminal 267. Combined AC and DC safety circuit 525 is dispositioned between switch pole 1 common terminal 261 and switch pole 2 common terminal 266 of DPDT relay 245 and existing AC power distribution circuit 110. Referring simultaneously to FIGS. 3 and 5, combined AC and DC safety circuit 525 includes the same elements and functions as AC safety circuit 325 with the following exceptions. Combined AC and DC safety circuit 525 is dispositioned such that single-pole AC switch 226 is coupled between switch pole 1 common terminal 261 and power output wire 260. Further, combined AC and DC safety circuit 525 is dispositioned such that single-pole AC switch 326 is coupled between switch pole 2 common terminal 266 and power output wire 265.

Referring simultaneously to FIGS. 1 and 5, AC & DC safety device 527 is configured to monitor, at the service panel, an AC and/or DC power surge and/or abnormal thermal condition associated with at least one power connection wire, e.g. AC hot wire 144 and/or AC neutral wire 154, at power output wire 260 and/or power output wire 265 respectively. When an AC and/or DC power surge and/or abnormal thermal condition is detected, AC & DC safety device 527 is configured to open both single-pole AC switch 226 and single-pole AC switch 326 to automatically disconnect power output wire 260 from switch pole 1 common terminal 261 and respectively disconnect power output wire 265 from switch pole 2 common terminal 266. By opening both single-pole AC switch 226 and single-pole AC switch 326, combined AC and DC safety circuit 525 is further configured to automatically disconnect AC hot wire 144 coupled to power output wire 260 and disconnect AC neutral wire 154 coupled to power output wire 265, and thereby disconnecting DC power or 120V AC power from entering existing AC power distribution circuit 110.

When an AC or DC power surge or abnormality takes place, combined AC and DC safety circuit 525 is activated to shut off power input to the pair of wires coupled to the power distribution circuit. DC power transfer device 240 may then still source DC power input to DPDT relay 245. Accordingly, the configuration of circuit breaker 500 is different from the configurations of circuit breakers 200, 300, and 400 depicted in FIGS. 2,3, and 4, where when an AC surge is detected during AC power sourcing, AC safety device 225, 325 will be activated to shut off the AC power input, and when a DC surge is detected, DC safety device 230 is activated to shut off DC power transfer device 240, while AC safety device 225, 325 is also shut off to block the AC power input coupled to the power distribution circuit.

The above embodiments of the present invention are illustrative and not limiting. Various alternatives and equivalents are possible. Although, the invention has been described with reference to exemplary AC voltage levels by way of an example, it is understood that the invention is not limited by the AC voltage level but may also be applicable to any AC voltage level. Although, the invention has been described with reference to exemplary DC voltage levels by way of an example, it is understood that the invention is not limited by the DC voltage level but may also be applicable to any DC voltage level. Although, the invention has been described with reference to an exemplary wall socket by way of an example, it is understood that the invention is not limited by the type of wall socket. Although, the invention has been described with reference to an exemplary service panel by way of an example, it is understood that the invention is not limited by the type of service panel or sub-panel, so long as circuit breakers are included in the service panel or sub-panel. The scope of the invention should, therefore, be determined not with reference to the above description, but instead should be determined with reference to the pending claims along with their full scope or equivalents.

What is claimed is:

1. A method to adaptively select between an AC power input and a DC power input for delivery to a plurality of power distribution circuits in a building, wherein one of the plurality of power distribution circuits includes at least one power connection wire and a socket, wherein the at least one power connection wire is connected between the socket and a circuit breaker, wherein the at least one power connection wire is selectively coupled through the circuit breaker to either the AC power input or the DC power input; wherein the DC power input, the AC power input, and the circuit breaker are dispositioned at a service panel, the method comprising:

monitoring a voltage level of the DC power input using a detection circuit in the circuit breaker;

using a switch circuit in the circuit breaker to couple the at least one power connection wire to the AC power input when the detection circuit detects the voltage level is below a threshold level; and coupling the at least one power connection wire to the DC power input when the detection circuit detects the voltage level is equal to or above the threshold level.

2. The method of claim 1 further comprising dispositioning an AC main breaker to disconnect the AC power input to the service panel.

3. The method of claim 1 further comprising dispositioning a DC main breaker to disconnect the DC power input to the service panel.

4. The method of claim 1 further comprising coupling one of the plurality of power distribution circuits to the AC power input while coupling another one of the plurality of power distribution circuits to the DC power input.

5. The method of claim 1 further comprising:

coupling one of the plurality of power distribution circuits to the DC power input when the voltage level is equal to or above a first threshold level; and coupling another one of the plurality of power distribution circuits to the DC power input when the voltage level is equal to or above a second threshold level different from the first threshold level.

6. The method of claim 1, wherein disabling the voltage detector decouples the DC power input to the circuit breaker.

7. The method of claim 1, wherein the service panel is an electric assembly, the method further comprising adaptively switching between the AC power input and the DC power input for charging an energy storage device.

8. The method of claim 1, wherein the at least one power connection wire comprises an AC hot wire and a first neutral wire.

9. The method of claim 8, wherein the AC power input at the service panel includes a second neutral wire, a first hot wire, and a second hot wire that is 180 degrees out of phase with the first hot wire, the method further comprising:

coupling the AC hot wire to a selected one from the group consisting of the first hot wire and the second hot wire; and coupling the first neutral wire to the second neutral wire when the circuit breaker couples the at least one power connection wire to the AC power input.

10. The method of claim 8 further comprising coupling the DC power input to a selected one from the group consisting of the AC hot wire and the first neutral wire when the circuit breaker couples the at least one power connection wire to the DC power input.

11. The method of claim 8 further comprising coupling the AC hot wire and the first neutral wire to the DC power input when the circuit breaker couples the at least one power connection wire to the DC power input.

12. The method of claim 11, wherein the socket includes an AC terminal and a neutral terminal, the method further comprising:

coupling the AC terminal to the AC hot wire; and coupling the neutral terminal to the first neutral wire, wherein the AC terminal and the neutral terminal are at an equal DC potential when the at least one power connection wire is coupled to the DC power input.

13. The method of claim 1, wherein the at least one power connection wire comprises a first AC hot wire and a second AC hot wire.

14. The method of claim 13, wherein the AC power input at the service panel includes a first hot wire, and a second hot wire that is 180 degrees out of phase with the first hot wire, the method further comprising:

coupling the first AC hot wire to the first hot wire; and coupling the second AC hot wire to the second hot wire, when the circuit breaker couples the at least one power connection wire to the AC power input.

15. The method of claim 13 further comprising coupling the DC power input to a selected one from the group consisting of the first AC hot wire and the second AC hot wire when the circuit breaker couples the at least one power connection wire to the DC power input.

16. The method of claim 13 further comprising coupling the first AC hot wire and the second AC hot wire to the DC power input when the circuit breaker couples the at least one power connection wire to the DC power input.

17. The method of claim 16, wherein the socket includes a first AC terminal and a second AC terminal, wherein the first AC terminal is coupled to the first AC hot wire and the second AC terminal is coupled to the second AC hot wire, the method further comprising setting the first AC terminal and the second AC terminal to an equal DC potential when the at least one power connection wire is coupled to the DC power input.

18. The method of claim 1 further comprising:
  monitoring the at least one power connection wire for a power surge at the circuit breaker; and
  automatically disconnecting the AC power input to the circuit breaker when an AC power surge is detected and automatically disconnecting the DC power input to the circuit breaker when a DC power surge is detected.

19. The method of claim 1 further comprising disposing the socket on the surface of a wall of the building.

20. A method of forming a circuit breaker comprising:
  forming a first terminal that couples to an AC power input;
  forming a second terminal that couples to a DC power input;
  forming an output terminal that couples to at least one power connection wire at one of a plurality of power distribution circuits in a building;
  forming a detection circuit that monitors a voltage level of the DC power input; and
  forming a switch circuit that couples the output terminal to the AC power input in a default condition and that couples to the DC power input when the detection circuit detects the voltage level is equal to or above a threshold level.

21. The method of claim 20, wherein the at least one power connection wire includes an AC hot wire and a first neutral wire, wherein the AC power input at the service panel includes a second neutral wire, and a first hot wire, the method further comprising:
  forming the switch circuit to include a double-pole double-throw relay having a first-pole common terminal, a second-pole common terminal, a first-pole normally-open terminal, a first-pole normally-closed terminal, a second-pole normally-open terminal, and a second-pole normally-closed terminal;
  coupling the AC hot wire to the first-pole common terminal and coupling the first neutral wire to the second-pole common terminal;
  coupling the AC hot wire to the first-pole normally-closed terminal that is coupled to the first hot wire and coupling the first neutral wire to the second-pole normally-closed terminal that is coupled to the second neutral wire, when the voltage level of the DC power input is below the threshold level; and
  switching, using the switch circuit, the AC hot wire from the first-pole normally-closed terminal to the first-pole normally-open terminal that is coupled to the DC power input and switching the first neutral wire from the second-pole normally-closed terminal to the second-pole normally-open terminal that is coupled to the DC power input, when the voltage level is equal to or above the threshold level.

22. The method of claim 20, wherein the at least one power connection wire comprises a first AC hot wire and a second AC hot wire, wherein the AC power input at the service panel includes a first hot wire, and a second hot wire that is 180 degrees out of phase with the first hot wire, the method further comprising:
  forming the switch circuit to include a double-pole double-throw relay having a first-pole common terminal, a second-pole common terminal, a first-pole normally-open terminal, a first-pole normally-closed terminal, a second-pole normally-open terminal, and a second-pole normally-closed terminal;
  coupling the first AC hot wire to the first-pole common terminal and coupling the second AC hot wire to the second-pole common terminal;
  coupling the first AC hot wire to the first-pole normally-closed terminal that is coupled to the first hot wire and coupling the second AC hot wire to the second-pole normally-closed terminal that is coupled to the second hot wire, when the voltage level of the DC power input is below the threshold level; and
  switching, using the switch circuit, the first AC hot wire from the first-pole normally-closed terminal to the first-pole normally-open terminal that is coupled to the DC power input and switching the second AC hot wire from the second-pole normally-closed terminal to the second-pole normally-open terminal that is coupled to the DC power input, when the voltage level is equal to or above the threshold level.

23. The method of claim 20, wherein the switch circuit comprises at least four transistors to implement a plurality of functions of the double-pole, double-throw relay.

24. The method of claim 20, wherein the at least one power connection wire includes an AC hot wire, wherein the AC power input at the service panel includes a first hot wire, and a second hot wire that is 180 degrees out of phase with the first hot wire, the method further comprising:
  forming the switch circuit to include a single-pole double-throw relay having a first-pole common terminal, a first-pole normally-open terminal, a first-pole normally-closed terminal;
  coupling the AC hot wire to the first-pole common terminal;
  coupling the AC hot wire to the first-pole normally-closed terminal that is coupled to the first hot wire, when the voltage level of the DC power input is below the threshold level; and
  switching, using the switch circuit, the AC hot wire from the first-pole normally-closed terminal to the first-pole normally-open terminal that is coupled to the DC power input, when the voltage level is equal to or above the threshold level.

25. The method of claim 24, wherein the switch circuit comprises at least two transistors to implement a plurality of functions of a single-pole double-throw relay.

26. The method of claim 20 further comprising forming the circuit breaker to include a transfer gate controlled by the detection circuit, wherein the transfer gate couples the DC power input to the third terminal when the voltage level is equal to or above the threshold level.

27. The method of claim 26 further comprising connecting a DC safety device to the second terminal of the circuit breaker to detect an abnormal surge at the DC power input and at the at least one power connection wire, wherein the DC safety device automatically tri-states the transfer gate by disabling an output of the voltage detector when the abnormal surge is detected.

28. The method of claim 20, wherein the AC power input includes at least one hot wire, the method further comprising connecting an AC safety device to the first terminal of the circuit breaker to detect an abnormal surge at the AC power input and at the at least one power connection wire, wherein the AC safety device automatically disconnects the at least one hot wire from the circuit breaker when the abnormal surge is detected.

29. The method of claim 20 further comprising connecting a safety device to the third terminal of the circuit breaker to detect an AC and DC power surge, wherein the safety device automatically disconnects the at least one power connection wire from the circuit breaker when the AC and DC power surge is detected.

30. A circuit breaker comprising:
a first terminal adapted to couple to an AC power input;
a second terminal adapted to couple to a DC power input;
a third terminal adapted to couple to at least one power connection wire of a power distribution circuit in a building, wherein the power connection wire is connected between a socket and the circuit breaker when the circuit breaker is installed in a service panel of the building;
a detection circuit adapted to monitor a voltage level of the DC power input; and
a switch circuit adapted to:
couple the third terminal to the AC power input in a default condition when the detection circuit detects the voltage level is below a threshold level; and
couple the third terminal to the DC power input when the detection circuit detects the voltage level is equal to or above the threshold level.

31. The circuit breaker of claim 30, wherein an AC main breaker is adapted to disconnect the AC power input to the service panel.

32. The circuit breaker of claim 30, wherein a DC main breaker is adapted to disconnect the DC power input to the service panel.

33. The circuit breaker of claim 30, wherein one of the plurality of power distribution circuits is coupled to the AC power input while another one of the plurality of power distribution circuits is coupled to the DC power input.

34. The circuit breaker of claim 30, further adapted to:
couple one of the plurality of power distribution circuits to the DC power input when the voltage level is equal to or above a first threshold level; and
couple another one of the plurality of power distribution circuits to the DC power input when the voltage level is equal to or above a second threshold level different from the first threshold level.

35. The circuit breaker of claim 30, further adapted to disable the voltage detector to decouple the DC power input to the circuit breaker.

36. The circuit breaker of claim 30, wherein the service panel is an electric assembly configured to adaptively switch between the AC power input and the DC power input for charging an energy storage device.

37. The circuit breaker of claim 30, wherein the at least one power connection wire comprises an AC hot wire and a first neutral wire.

38. The circuit breaker of claim 37, wherein the AC power input at the service panel includes a second neutral wire, a first hot wire, and a second hot wire that is 180 degrees out of phase with the first hot wire, wherein the circuit breaker is further adapted to couple the AC hot wire to a selected one from the group consisting of the first hot wire and the second hot wire, and wherein the circuit breaker is further adapted to couple the first neutral wire to the second neutral wire when the circuit breaker couples the at least one power connection wire to the AC power input.

39. The circuit breaker of claim 37, further adapted to couple the DC power input to a selected one from the group consisting of the AC hot wire and the first neutral wire when the circuit breaker couples the at least one power connection wire to the DC power input.

40. The circuit breaker of claim 37, further adapted to couple the AC hot wire and the first neutral wire to the DC power input when the circuit breaker couples the at least one power connection wire to the DC power input.

41. The circuit breaker of claim 30, wherein the socket includes an AC terminal and a neutral terminal, wherein the AC terminal is coupled to the AC hot wire and the neutral terminal is coupled to the first neutral wire, wherein the AC terminal and the neutral terminal are at an equal DC potential when the at least one power connection wire is coupled to the DC power input.

42. The circuit breaker of claim 30, wherein the at least one power connection wire comprises a first AC hot wire and a second AC hot wire.

43. The circuit breaker of claim 42, wherein the AC power input at the service panel includes a first hot wire, and a second hot wire that is 180 degrees out of phase with the first hot wire, wherein the circuit breaker is further adapted to couple the first AC hot wire to the first hot wire and to couple the second AC hot wire to the second hot wire, when the circuit breaker couples the at least one power connection wire to the AC power input.

44. The circuit breaker of claim 42, further adapted to couple the DC power input to a selected one from the group consisting of the first AC hot wire and the second AC hot wire when the circuit breaker couples the at least one power connection wire to the DC power input.

45. The circuit breaker of claim 42, further adapted to couple the first AC hot wire and the second AC hot wire to the DC power input when the circuit breaker couples the at least one power connection wire to the DC power input.

46. The circuit breaker of claim 45, wherein the socket includes a first AC terminal and a second AC terminal, wherein the first AC terminal is coupled to the first AC hot wire and the second AC terminal is coupled to the second AC hot wire, wherein the first AC terminal and the second AC terminal are at equal DC potential when the at least one power connection wire is coupled to the DC power input.

47. The circuit breaker of claim 30, further adapted to:
monitor the at least one power connection wire for a power surge at the circuit breaker; and
automatically disconnect the AC power input to the circuit breaker when an AC power surge is detected and automatically disconnect the DC power input to the circuit breaker when a DC power surge is detected.

48. The circuit breaker of claim 30, wherein the socket is disposed on the surface of a wall of the building.

49. The circuit breaker of claim 30, wherein the at least one power connection wire includes an AC hot wire and a first neutral wire, wherein the AC power input at the service panel includes a second neutral wire, and a first hot wire,
wherein the switch circuit includes a double-pole double-throw relay having a first-pole common terminal, a second-pole common terminal, a first-pole normally-open terminal, a first-pole normally-closed terminal, a second-pole normally-open terminal, and a second-pole normally-closed terminal, wherein the AC hot wire is coupled to the first-pole common terminal and the first neutral wire is coupled to the second-pole common terminal, and wherein the AC hot wire is coupled to the first-pole normally-closed terminal that is coupled to the first hot wire and the first neutral wire is coupled to the second-pole normally-closed terminal that is coupled to the second neutral wire, when the voltage level of the DC power input is below the threshold level, wherein the switch circuit is adapted to:
switch the AC hot wire from the first-pole normally-closed terminal to the first-pole normally-open terminal that is coupled to the DC power input; and
switch the first neutral wire from the second-pole normally-closed terminal to the second-pole normally-open terminal that is coupled to the DC power input, when the voltage level is equal to or above the threshold level.

50. The circuit breaker of claim 30, wherein the at least one power connection wire comprises a first AC hot wire and a second AC hot wire, wherein the AC power input at the service panel includes a first hot wire, and a second hot wire that is 180 degrees out of phase with the first hot wire, wherein the switch circuit includes a double-pole double-throw relay having a first-pole common terminal, a second-pole common terminal, a first-pole normally-open terminal, a first-pole normally-closed terminal, a second-pole normally-open terminal, and a second-pole normally-closed terminal, wherein the first AC hot wire is coupled to the first-pole common terminal and the second AC hot wire is coupled to the second-pole common terminal, wherein the first AC hot wire is coupled to the first-pole normally-closed terminal that is coupled to the first hot wire and the second AC hot wire is coupled to the second-pole normally-closed terminal that is coupled to the second hot wire, when the voltage level of the DC power input is below the threshold level, and wherein the switch circuit is adapted to switch the first AC hot wire from the first-pole normally-closed terminal to the first-pole normally-open terminal that is coupled to the DC power input and the switch circuit is further adapted to switch the second AC hot wire from the second-pole normally-closed terminal to the second-pole normally-open terminal that is coupled to the DC power input, when the voltage level is equal to or above the threshold level.

51. The circuit breaker of claim 30, wherein the switch circuit comprises at least four transistors adapted to implement a plurality of functions of a double-pole double-throw relay.

52. The circuit breaker of claim 30, wherein the at least one power connection wire includes an AC hot wire, wherein the AC power input at the service panel includes a first hot wire, and a second hot wire that is 180 degrees out of phase with the first hot wire, wherein the switch circuit includes a single-pole double-throw relay having a first-pole common terminal, a first-pole normally-open terminal, a first-pole normally-closed terminal, wherein the AC hot wire is coupled to the first-pole common terminal, wherein the AC hot wire is coupled to the first-pole normally-closed terminal that is coupled to the first hot wire, when the voltage level of the DC power input is below the threshold level, and wherein the switch circuit is adapted to switch the AC hot wire from the first-pole normally-closed terminal to the first-pole normally-open terminal that is coupled to the DC power input, when the voltage level is equal to or above the threshold level.

53. The circuit breaker of claim 30, wherein the switch circuit comprises at least two transistors adapted to implement a plurality of functions of a single-pole double-throw relay.

54. The circuit breaker of claim 30, wherein the circuit breaker further includes a transfer gate controlled by the detection circuit, wherein the transfer gate is adapted to couple the DC power input to the third terminal when the voltage level is equal to or above the threshold level.

55. The circuit breaker of claim 54, wherein a DC safety device, connected to the second terminal of the circuit breaker, is adapted to detect an abnormal surge at the DC power input and at the at least one power connection wire, wherein the DC safety device is adapted to automatically tri-state the transfer gate by disabling an output of the voltage detector when the abnormal surge is detected.

56. The circuit breaker of claim 30, wherein the AC power input includes at least one hot wire, wherein an AC safety device, connected to the first terminal of the circuit breaker, is adapted to detect an abnormal surge at the AC power input and at the at least one power connection wire, wherein the AC safety device is adapted to automatically disconnect the at least one hot wire from the circuit breaker when the abnormal surge is detected.

57. The circuit breaker of claim 30, wherein a safety device, connected to the third terminal of the circuit breaker, is adapted to detect an AC and DC power surge, wherein the safety device is adapted to automatically disconnect the at least one power connection wire from the circuit breaker when the AC and DC power surge is detected.

* * * * *